A. G. CAMPBELL.
WIND AND WEATHER SCREEN FOR MOTORCYCLES.
APPLICATION FILED DEC. 31, 1919.

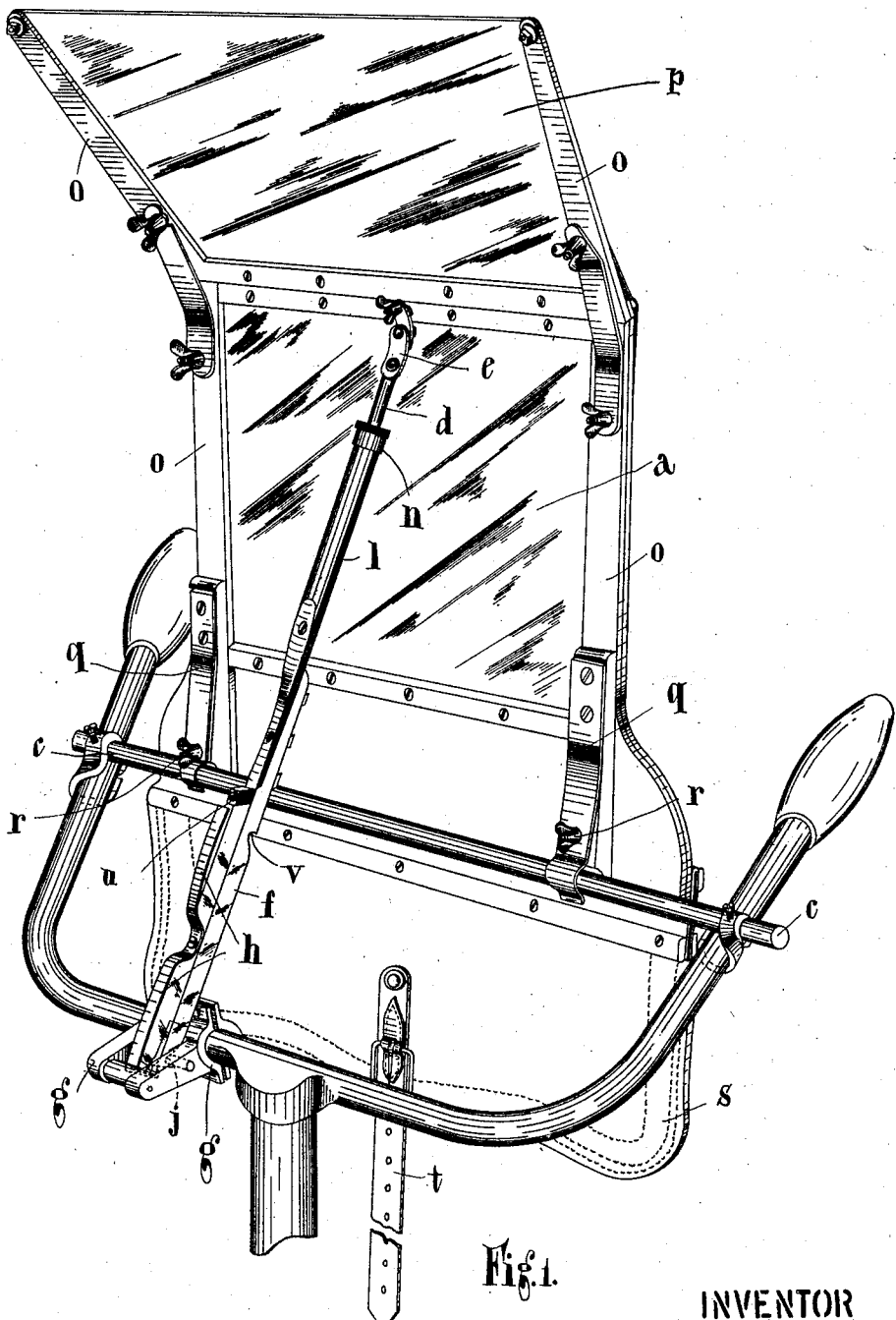

1,387,349.

Patented Aug. 9, 1921.
2 SHEETS—SHEET 2.

INVENTOR
A.G.Campbell
BY H.R.Kerslake
ATTORNEY

UNITED STATES PATENT OFFICE.

ARCHIBALD GOWAN CAMPBELL, OF RICHMOND, ENGLAND.

WIND AND WEATHER SCREEN FOR MOTORCYCLES.

1,387,349.  Specification of Letters Patent.  Patented Aug. 9, 1921.

Application filed December 31, 1919. Serial No. 348,671.

*To all whom it may concern:*

Be it known that I, ARCHIBALD GOWAN CAMPBELL, a subject of the King of Great Britain and Ireland, and residing at Asgard, The Green, Richmond, Surrey, England, have invented certain new and useful Improvements in Wind and Weather Screens for Motorcycles, of which the following is a specification.

This invention relates to a detachable wind screen for motor cycles and has for its object to provide a convenient, light and easily detachable screen for the protection of the face and body of motor cyclists.

The invention consists in a wind and weather screen for the protection of the face and body of the rider of a motor cycle, the screen being pivotally supported on a transverse axis in the region of the handle bars of the motor cycle, and while normally constrained in its rocking movement about this axis yet is capable of being partially rotated forward out of the rider's way when desired.

The invention also consists in a wind and weather screen as indicated above in which means are provided normally to restrain the screen in two or more alternative positions and also to allow of a limited and restrained rocking movement for the purpose of absorbing road shocks and vibration.

The invention also consists in the wind and weather screens herein described.

Figure 3:
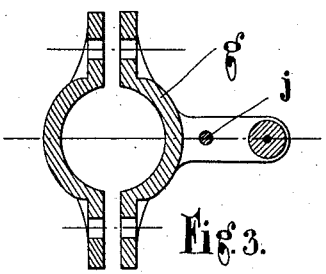
Figure 4:
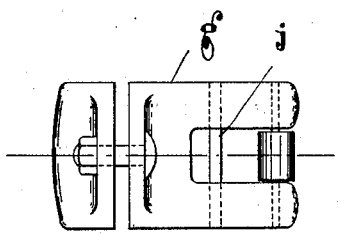
Figure 2:
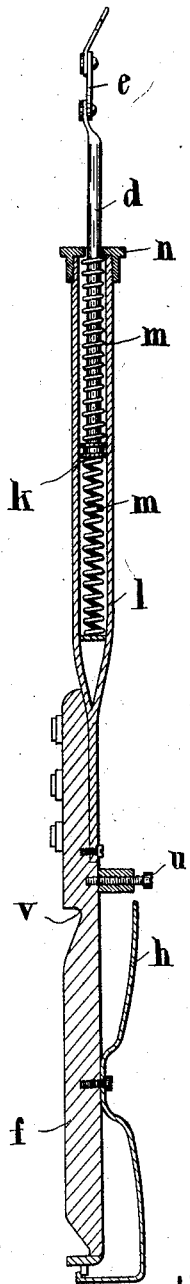

Referring to the accompanying sketches, Figure 1 represents a perspective view of a convenient arrangement according to the present invention. Fig. 2 is a sectional view of the strut indicated in Fig. 1. Figs. 3 and 4 are sectional and elevational views respectively of the strut slide fitting indicated in Fig. 1.

In carrying the invention into effect in one form illustrated by way of example in Fig. 1, the screen $a$ is supported and pivoted at or near its lower edge on a transverse axis on the handle bars of the motor cycle.

The supporting axis is shown as taking the form of a round tube $c$ fixed across the handle bar by suitable clips just in front of the handle grips thereof.

The screen is free to rock about its axis but is held in position by a strut the upper end of which $d$ is attached by means of a flexible joint or hinge $e$ to the center of the screen, while the lower part $f$ of the strut slides through a fitting $g$ attached to the front portion of the handle bar and is held there by a suitable device described below.

In order to support the screen in its normal position a notch $j$ is provided on the lower end $f$ of the strut and this is kept in engagement with a pin passing through the fitting $g$ by a spring $h$ of sufficient strength to hold it there against the forces due to the wind and weather on the screen oscillations of the handle bars and the like. The shape of the notch $j$ and the strength of the spring $h$ is such that any considerable forward pressure on the screen could release the notch from engagement with the fitting $g$ and allow the strut to slide forward and downward through the fitting $g$, the screen partially rotating forward about its axis. The stop limits the forward movement of the strut and a second notch secures the latter in position. The pressure necessary to produce this forward motion would be intentionally applied by the rider of the motor cycle if he wished to push the screen well clear of his face and body for any reason, for example, for the purpose of making a "running mount," the screen being subsequently pulled back by him into its normal position and retained there by the lower notch $j$ as explained above.

It would similarly be pushed forward out of his way in the case of his being thrown against it by a violent jolt or in an accident.

In the form illustrated the two parts $f$ and $d$ of the strut are resiliently interconnected, the upper part $d$ being of rod form and provided with a plunger $k$, sliding preferably with a certain amount of friction within the tubular part $l$.

Two compression springs $m$—$m$ bear respectively on opposite sides against this plunger and are retained within the tube $l$ by a retaining cap $n$. By this means it will be seen that the screen is not only capable of being partially rotated about its axis as above while the strut slides from one position or notch to another, but it is also capable of a similar but smaller rocking movement for the purpose of absorbing road shocks or vibration, the spring buffer permitting of a limited longitudinal extension or contraction of the strut, with a corresponding limited rocking movement of the screen about its axis.

The flexible connection at the top of the strut need not be made exactly opposite the point at which the fitting $g$ is attached to the handle bars, but the latter should be fixed in a convenient position to enable the sliding strut to clear the spring forks, lamp, speedometer and the like of the motor cycle throughout its range of movement, the flexible joint $e$ at the upper end of the strut allowing for an eccentric or lateral displacement of the lower portion of the strut.

In the form illustrated the strut is shown as provided with two notches only but if desired it may be provided with several notches, stops or the like which permit of the wind screen being fixed in several alternative positions.

For convenience of portability and adjustment, the screen is made of two light wooden, metal or equivalent frames $o$ so hinged together horizontally that the upper part is capable of being folded back.

The upper frame $o$ is filled with sheet celluloid or other suitable transparent material $p$ and the lower part may be filled with similar or other suitable material.

The top portion is preferably made with the upper end of the transparent material itself forming the upper edge of the screen.

In the case of the form of folding screen shown the top edge of the strut is attached by this flexible joint or hinge to the front of the lower frame, a suitable point of attachment being the center of the upper side of the frame just below the division between the two frames as shown in Fig. 1.

In normal use the screen is adjusted at such a height and angle that the rider of the motor cycle is just able to see comfortably over its top edge, and at such a distance from his face (say about 8" or 1') that he obtains the maximum protection from air currents compatible with his uninterrupted view of the road. In practice a width of about 16" and a height of about 12" and 10" respectively for the lower and upper portions of the screen has been found satisfactory, and, in the case of a folding screen, the lower portion may slope backward at an angle of about 15° with the vertical, and upper part be approximately vertical when the screen is in its normal position. In wet weather the adjustable folding screen may be arranged to give additional protection to the face and neck of the rider by using it with the lower part sloped slightly forward and the relative angle of the upper part re-adjusted and clamped to bring the latter once more into an approximately vertical position. The rider will then be enabled to bend forward so as to bring his head more fully under the protection of the screen and will view the road through the transparent material of the upper portion while still retaining the option of sitting up and looking over its top edge if necessary.

The bearings or clips $q$—$q$ by which the screen rocks on its supporting axis are divided and clamped together about the tube $c$ by means of wing nuts $r$ whereby the screen may readily be attached to or removed from the handle bars and at the same time friction of the screen can be adjusted to allow greater or less freedom of rocking movement by the screen.

The lower edge of the screen bears a flap or apron $s$ which is hinged to it extending downward so as to just clear the top tube of the motor cycle frame and is kept in the desired position by a suitable strap $t$.

It will be understood that the form illustrated is shown by way of example only and modifications may be made as convenient.

Having now described my invention what I claim as new and desire to secure by Letters Patent is:—

1. A wind and weather screen for the protection of the rider of a motor-cycle including in combination a pivoted screen, a bearing member rigid with the handle-bars of the motor-cycle upon which said screen can rock said bearing member restraining said rocking action to a transverse axis, and resilient means connecting said screen to the motor-cycle.

2. A wind and weather screen for the protection of the rider of a motor-cycle including in combination a pivoted screen, a bearing member rigid with the handle-bars of the motor-cycle upon which said screen can rotate, resilient means connecting said screen to a point on the handle-bars and means for adjusting the position of the range of resilient movement.

3. A wind and weather screen for the protection of the rider of a motor-cycle including in combination a pivoted screen, a bearing member rigid with the handle-bars of the motor-cycle upon which said screen can rotate, resilient means connecting said screen to the motor-cycle and a means for adjusting the length of said resilient connection to allow such rotation of the screen as may be required for instance in emergency.

In testimony whereof I have signed my name to this specification.

ARCHIBALD GOWAN CAMPBELL.